United States Patent
Lund

[19]

[11] Patent Number: 6,099,064
[45] Date of Patent: Aug. 8, 2000

[54] WINDSHIELD VISOR FOR MOTOR VEHICLES

[75] Inventor: David Lund, Detroit Lakes, Minn.

[73] Assignee: Lund Industries, Inc., Anoka, Minn.

[21] Appl. No.: 09/113,236

[22] Filed: Jul. 10, 1998

[51] Int. Cl.[7] .......................................................... B60J 1/20
[52] U.S. Cl. .......................... 296/95.1; 296/152; 296/154
[58] Field of Search .................................... 296/95.1, 152, 296/154, 91, 146.9, 84.1; D12/181, 182

[56] References Cited

U.S. PATENT DOCUMENTS

| | | |
|---|---|---|
| D. 85,241 | 9/1931 | Henderson . |
| D. 154,735 | 8/1949 | Arbib . |
| D. 154,861 | 8/1949 | Maher . |
| D. 156,479 | 12/1949 | Bingman . |
| D. 157,555 | 3/1950 | Abrams . |
| D. 159,144 | 6/1950 | Dieterich . |
| D. 167,676 | 9/1952 | Chicorel . |
| D. 201,496 | 6/1965 | Stef . |
| D. 239,705 | 4/1976 | Lund . |
| D. 252,680 | 8/1979 | Kingsley et al. . |
| D. 261,500 | 10/1981 | Butler . |
| D. 272,429 | 1/1984 | Trombley et al. . |
| D. 273,672 | 5/1984 | Lund . |
| D. 283,120 | 3/1986 | Trombley et al. . |
| D. 283,611 | 4/1986 | Kingsley . |
| D. 284,565 | 7/1986 | Trombley et al. . |
| D. 288,309 | 2/1987 | Lund . |
| D. 288,310 | 2/1987 | Lund . |
| D. 291,295 | 8/1987 | Lund . |
| D. 299,713 | 2/1989 | Dunham . |
| D. 300,918 | 5/1989 | Turner . |
| D. 301,028 | 5/1989 | Buck . |
| D. 301,450 | 6/1989 | Kingsley . |
| D. 304,819 | 11/1989 | Chapman et al. . |
| D. 312,238 | 11/1990 | Lund . |
| D. 319,209 | 8/1991 | Miller et al. . |
| 2,073,159 | 3/1937 | Lintern et al. . |
| 2,236,846 | 4/1941 | Davisson . |
| 2,475,901 | 7/1949 | Kipp . |
| 2,534,763 | 12/1950 | Flavin . |
| 2,566,934 | 9/1951 | Dietrich . |
| 2,567,501 | 9/1951 | Zeis et al. . |
| 2,599,809 | 6/1952 | Branch . |
| 2,757,954 | 8/1956 | Hurley . |
| 2,777,732 | 1/1957 | Walsh . |
| 2,792,254 | 5/1957 | Hagglund . |
| 2,793,705 | 5/1957 | Garrity . |
| 3,015,517 | 1/1962 | Thornburgh . |
| 3,022,848 | 2/1962 | Heiser . |
| 3,214,216 | 10/1965 | Brown, Jr. . |
| 3,678,635 | 7/1972 | Vagi et al. . |

(List continued on next page.)

FOREIGN PATENT DOCUMENTS

| | | |
|---|---|---|
| 1 096 819 | 6/1955 | France . |
| 1 121 035 | 7/1956 | France . |
| 734 743 | 8/1955 | United Kingdom . |
| 829 154 | 2/1960 | United Kingdom . |

OTHER PUBLICATIONS

*Hot Rod*, p. 96 (Aug. 1975).
Volvo GM Heavy Truck Corporation publication, 8 pp. copyright 1987.

*Primary Examiner*—D. Glenn Dayoan
*Assistant Examiner*—Jason Morrow
*Attorney, Agent, or Firm*—Merchant & Gould P.C.

[57] ABSTRACT

Windshield visor for motor vehicles having windshield, roof, and driver and passenger side door frames. The windshield visor includes a forward wing, a first mounting plate, and a second mounting plate. The forward wing provides shading from sun light and shielding from precipitation, and has left and right wing tips, top and bottom surfaces, and leading and trailing edges. The first mounting plate is connected to the left wing tip of forward wing and attaches to a motor vehicle's driver side door frame. The second mounting plate is connected to the right wing tip of the forward wing and attached to the motor vehicle's passenger side door frame. A stud post fastener is provided for adhering to the motor vehicle's roof and for releasably attaching to the forward wing.

16 Claims, 3 Drawing Sheets

U.S. PATENT DOCUMENTS

| | | |
|---|---|---|
| 3,695,674 | 10/1972 | Baker . |
| 3,728,537 | 4/1973 | Barényi et al. . |
| 3,785,699 | 1/1974 | Molaskey et al. . |
| 3,815,700 | 6/1974 | Mittendorf . |
| 4,018,472 | 4/1977 | Mason, Jr. . |
| 4,040,656 | 8/1977 | Clenet . |
| 4,043,587 | 8/1977 | Giallourakis et al. . |
| 4,052,099 | 10/1977 | Lowery et al. . |
| 4,063,773 | 12/1977 | Modesette . |
| 4,149,749 | 4/1979 | Canal . |
| 4,153,129 | 5/1979 | Redmond . |
| 4,159,845 | 7/1979 | Bratsberg . |
| 4,219,870 | 8/1980 | Haraden et al. . |
| 4,262,954 | 4/1981 | Thompson . |
| 4,320,919 | 3/1982 | Butler . |
| 4,412,698 | 11/1983 | Kingsley . |
| 4,471,991 | 9/1984 | Matthias . |
| 4,493,577 | 1/1985 | Cosenza ..................................... 403/41 |
| 4,627,657 | 12/1986 | Daniels et al. . |
| 4,707,014 | 11/1987 | Rich . |
| 4,726,619 | 2/1988 | Haugestad . |
| 4,758,040 | 7/1988 | Kingsley et al. . |
| 4,776,627 | 10/1988 | Hutto et al. . |
| 4,819,136 | 4/1989 | Ramsey . |
| 4,842,320 | 6/1989 | Kingsley . |
| 4,842,912 | 6/1989 | Hutter, III ........................ 248/205.3 X |
| 4,929,013 | 5/1990 | Eke . |
| 4,966,404 | 10/1990 | Lund . |
| 5,112,095 | 5/1992 | Lund et al. . |
| 5,130,906 | 7/1992 | Lund . |
| 5,475,956 | 12/1995 | Agrawal et al. .......................... 52/208 |
| 5,522,634 | 6/1996 | Stanesic et al. . |
| 5,636,892 | 6/1997 | Gordon . |
| 5,664,871 | 9/1997 | Thompson . |
| 5,851,044 | 12/1998 | Lund . |

WINDSHIELD VISOR FOR MOTOR VEHICLES

FIELD OF THE INVENTION

The present invention relates to a windshield visor for motor vehicles, a motor vehicle having a windshield visor, a method for manufacturing a windshield visor, and a method for attaching a windshield visor to a motor vehicle.

BACKGROUND OF THE INVENTION

Windshield visors have been attached to trucks and other motor vehicles to provide protection against sun and rain and to provide increased visibility. They generally extend beyond the forward edge of the roof and over the front windshield of the motor vehicle.

A concern with windshield visors is that sufficient structural mounting and air relief are provided. The forward movement of the vehicle causes air flowing upward and across the front windshield to provide a force against the bottom surface of the visor. During high speed travel, the force of the air has been found to rip poorly designed visors from the motor vehicle. Even if the visor is securely attached, the differences in air pressure across the lower surface can cause "flutter." This is exhibited by a bending and/or twisting motion. Flutter can also result if the visor is not sufficiently rigid and strong. The occurrence of flutter is not only distracting to the vehicle occupants, but it can also fatigue the visor at those locations where it is mounted to the vehicle and eventually cause it to rip off the vehicle's roof. Therefore, windshield visors should be designed so they can securely attach to the vehicle, and provide sufficient air relief and rigidity.

Roof mounted windshield visors are fairly common and are described, for example, in U.S. Pat. No. Des. 288,309 to Lund; U.S. Pat. No. Des. 312,238 to Lund; U.S. Pat. No. 4,966,404 to Lund; U.S. Pat. No. Des. 301,450 to Kingsly; U.S. Pat. No. Des. 301,028 to Buck;. U.S. Pat. No. 291,295 to Lund; U.S. Pat. No. Des. 288,310 to Lund; U.S. Pat. No. 4,726,619 to Haugestad; and U.S. Pat. No. 4,842,320 to Kingsley. The windshield visors described by these patents can be characterized as roof mounted visors since they require fastening to the motor vehicle's roof at several locations. Most commonly, the fastening points are in the roof immediately above the front windshield. The visor then extends from the forward edge of the roof and outward, over the windshield.

Many of the above-described visors provide sufficient structural support. Their points of attachment, however, are in the roof of the vehicle or at the juncture of the roof and the edge of the windshield. Owners of new trucks or utility vehicles are often reluctant to put holes in their new vehicle at those highly visible locations. If they ever decide to remove the windshield visor, expensive repair work would be necessary to remove the scars and return the vehicle to its original appearance. Furthermore, the repairs may never completely hide the fact that holes were drilled or punched in the roof. Similarly, people who lease motor vehicles are often reluctant to purchase a windshield visor since the visor may have to remain with the motor vehicle after the lease expires.

A new style of light truck and utility vehicle has been developed which is more aerodynamic than older trucks. This new style is characterized by a more rounded and sleeker look, and the replacement of exterior drip rails or rain gutters with "aircraft style doors" which provide internal rain gutters. For many consumers, the presently available windshield visors do not provide a satisfactory look on these newly designed vehicles. A part of the problem appears to be that several roof mounted visors do not adequately fit the curved contour of the roof. In addition, a sleeker or softer looking visor is desired for these vehicles.

U.S. Pat. No. 5,851,044 and U.S. Pat. No. Des. 403,999 describe visors which attach to a motor vehicle along the internal rain gutters and which do not provide holes in the roof of the motor vehicle. U.S. Pat. No. 5,851,044 and U.S. Pat No. Des. 403,999 are incorporated by reference herein in their entirety.

SUMMARY OF THE INVENTION

A windshield visor for use on motor vehicles having windshield, roof, and driver and passenger side door frames, is provided by the present invention. A windshield visor is a device which is attachable to a motor vehicle to provide shading of the windshield from sun light and/or shielding of the windshield from precipitation.

The windshield visor of the present invention includes a forward wing for providing shading from sun light and shielding from precipitation, a first mounting plate, and a second mounting plate. The forward wing includes left and right wing tips, top and bottom surfaces, and leading and trailing edges. The first mounting plate is connected to the left wing tip of the forward wing and is constructed and arranged to attach to a motor vehicle's driver side door frame. The second mounting plate is connected to the right wing tip of said forward wing and is constructed and arranged to fit a motor vehicle's passenger side door frame. It should be appreciated that in the context of the present invention, the terms "left" and "right" describe the left and right sides, respectively, from the position of the driver of the motor vehicle. In most situations, it should be understood that the left side refers to the driver's side of the motor vehicle, and the right side refers to the passenger's side of the motor vehicle.

The forward wing preferably includes a top panel and a bottom panel secured together by adhesive. The trailing edge of the forward wing is constructed and arranged to provide an air relief vent which allows the air to pass over the vehicle' windshield and through the vent. The visor includes a stud fastener for adhering to a motor vehicle's roof and for releasably attaching to the forward wing.

A motor vehicle is provided by the present invention. The motor vehicle includes: a windshield; driver and passenger side door frames; and a visor which includes a forward wing for shading the windshield from sun light and shielding the windshield from precipitation, a first mounting plate connected to the left wing tip of the forward wing and the driver side door frame, a second mounting plate connected to the right wing tip of the forward wing and the passenger side door frame, and a stud post fastener. The stud post fastener is provided for adhering to a motor vehicle's roof and for releasably attaching to the forward wing.

The windshield visor can be attached to the motor vehicle by adhering the stud post fastener to the motor vehicle roof; placing the mounting plates of the visor along the driver and passenger door frames of a motor vehicle; fastening the visor to the door frame of the motor vehicle; and fastening the stud post fastener to the forward wing.

A stud post fastener is provided according to the present invention. The stud post fastener includes a base and a stud. The base is constructed to lay against a portion of a motor vehicle and adhere thereto by adhesive. The stud extends from the base and is provided for attachment to a motor vehicle accessory. Preferably, the stud includes threads for receiving a bolt for securing a motor vehicle accessory thereto. Exemplary accessories include visors and cab farings.

DETAILED DESCRIPTION OF THE INVENTION

Figure 1:
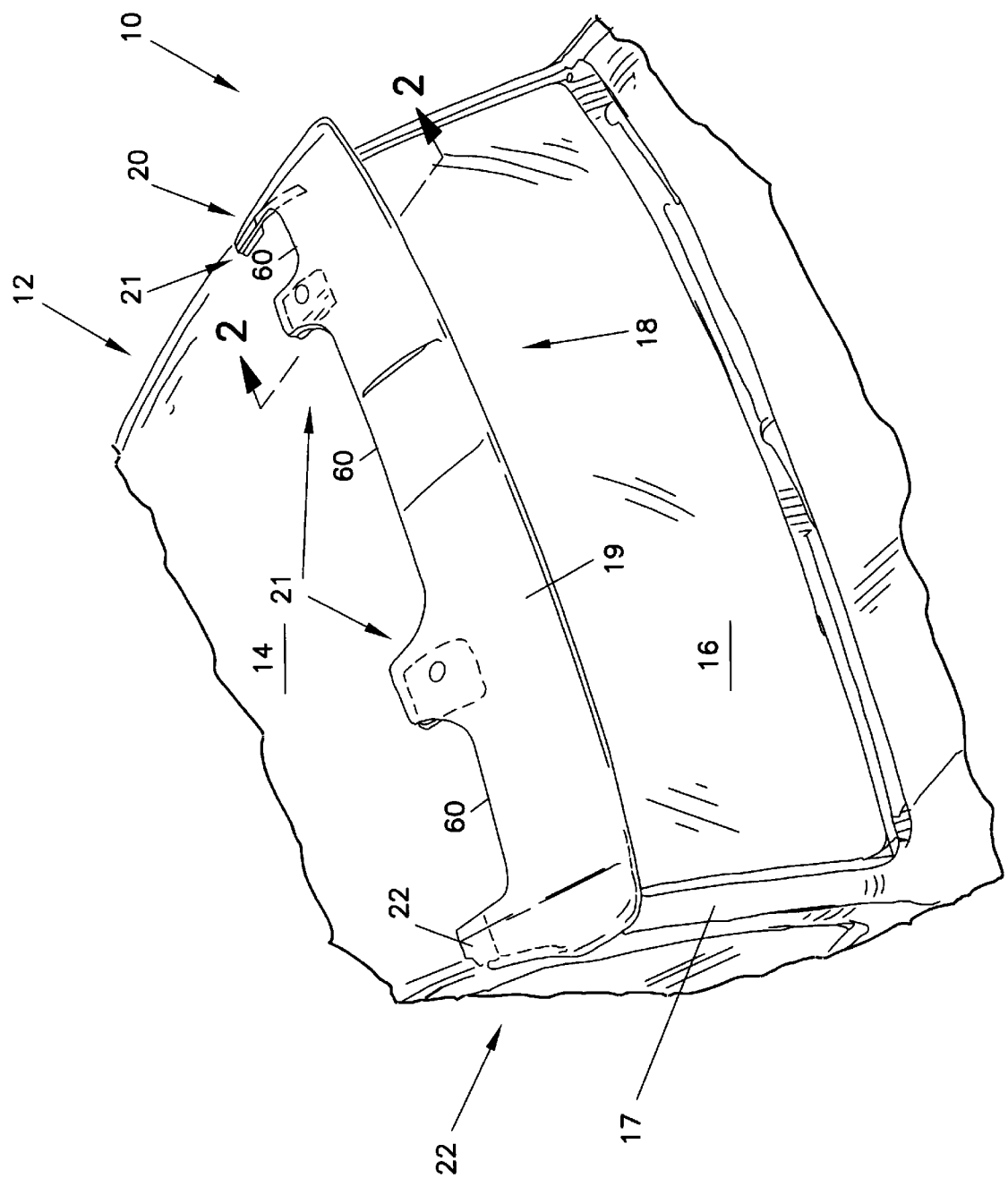
FIG. 1 is a perspective view of a windshield visor according to the principles of the present invention mounted on a truck.
Figure 2:
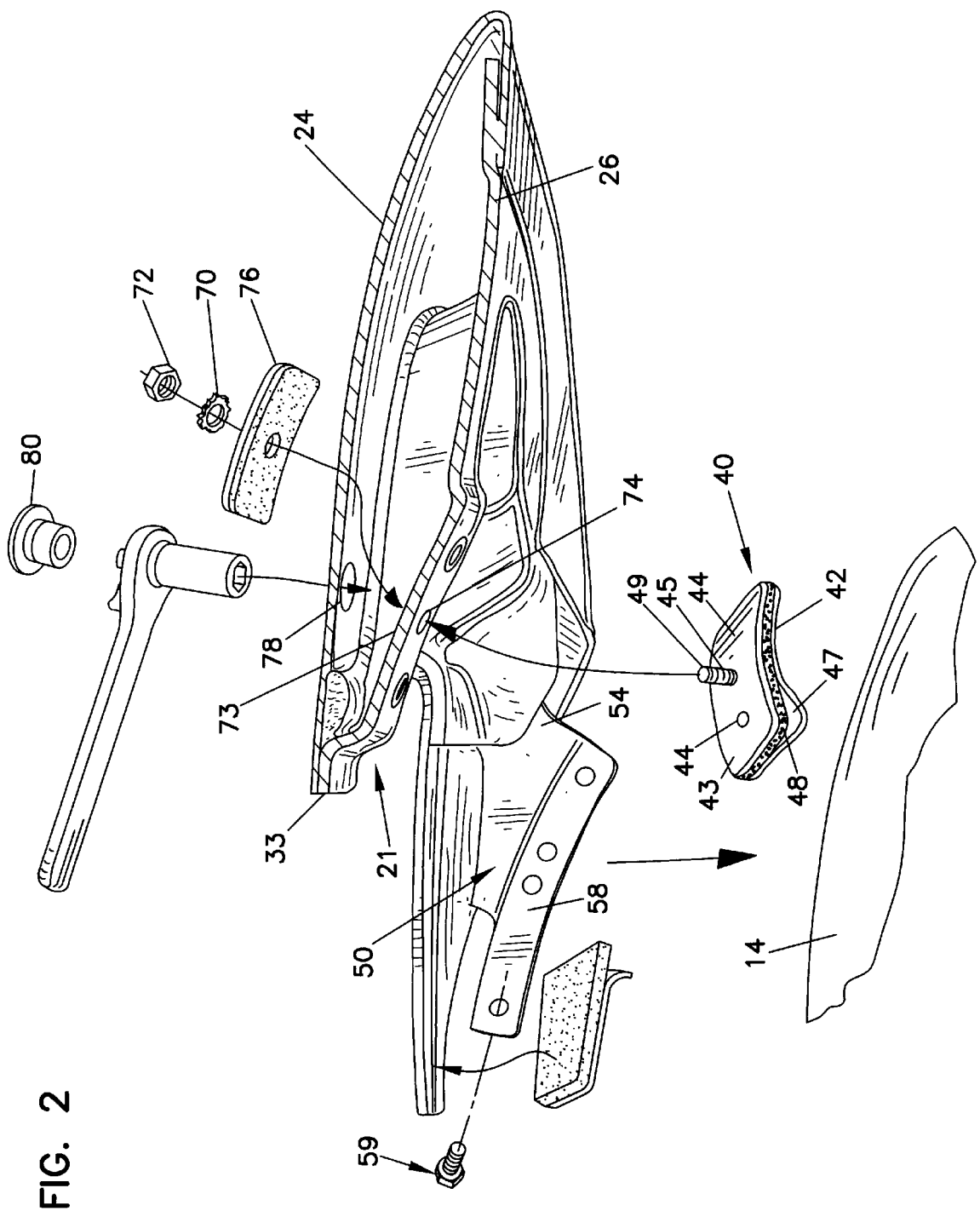
FIG. 2 is an assembly view of the windshield visor of FIG. 1.
Figure 3:
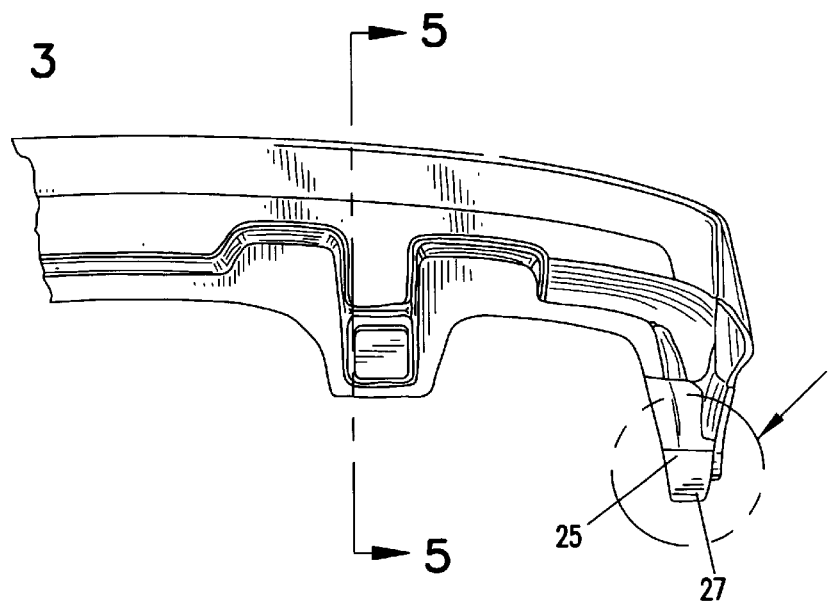
FIG. 3 is a partial bottom view of the windshield visor of FIG. 1.

The preferred embodiments of the invention are now described in detail with reference to the drawings, wherein like reference numerals represent like parts and assemblies throughout the several views. Reference to the preferred embodiments does not limit the scope of the invention which is limited only by the scope of the claims attached hereto.

Referring to FIGS. 1–5, a windshield visor in accordance with the present invention is depicted at reference numeral 10 and is mounted to a truck 12 extending generally away from the truck roof 14 and over the windshield 16. According to the present invention, a windshield visor is a device which is attachable to a motor vehicle to provide shading of the windshield from sun light and/or shielding of the windshield from precipitation. The windshield visor of the present invention may hereinafter be referred to as the visor.

As those skilled in the art will appreciate, the dimensions of vehicle windshields, roof lines, door frames and the like varies widely from manufacturer to manufacturer. For the most part, the configurations employed by each manufacturer for each motor vehicle model are different. Accordingly, it should be understood that the following described windshield visor may be unique to a particular motor vehicle, but the teachings herein can be applied to windshield visors for other models.

The windshield visor according to the present invention is preferably mounted to light trucks, such as a pickup trucks, or utility vehicles. It should be appreciated, however, that the windshield visor can be used on other motor vehicles such as cars, boats, heavy trucks, and the like. It is understood that one having skill in the art would readily appreciate that the present invention can be adapted for motorized and non-motorized vehicles. Furthermore, motor vehicles not having exterior rain rails or gutters are particularly suited for use with the windshield visor of the present invention. It is a common feature in many of the presently marketed models of trucks and utility vehicles that the rain gutters are provided within the door frame. This style of rain gutter can be referred to as "aerodynamic rain gutters" or "interior rain gutters." By removing the exterior rain gutters, the motor vehicles have, in general, taken on a more rounded or softer look, and have gotten away from the hard edge or sharp angular look. In addition, the roofs of the motor vehicles tend to be more curved.

The windshield visor 10 includes a shading and shielding region 18, side mounting regions 20, 22, and central mounting region 21. When mounted on the truck 12, the shading and shielding region 18 extends forward of the roof 14 and above or over the front windshield 16 thereby providing shading of the windshield 16 from sun and shielding from precipitation. The side mounting regions 20, 22 are provided for securely attaching the windshield visor 10 to the door frame 17 of the truck 12. The central mounting region 21 is provided for assisting to keep the forward wing 19 from fluttering when the truck 12 is being driven. The details of each of these regions is described in more detail below.

Figure 4:
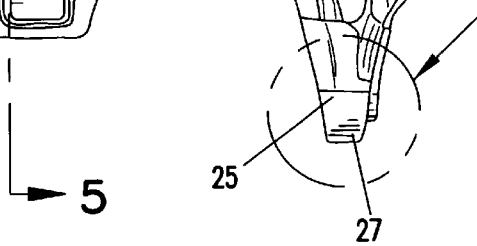
FIG. 4 is a partial view of the windshield visor of FIG. 3.
Figure 5:
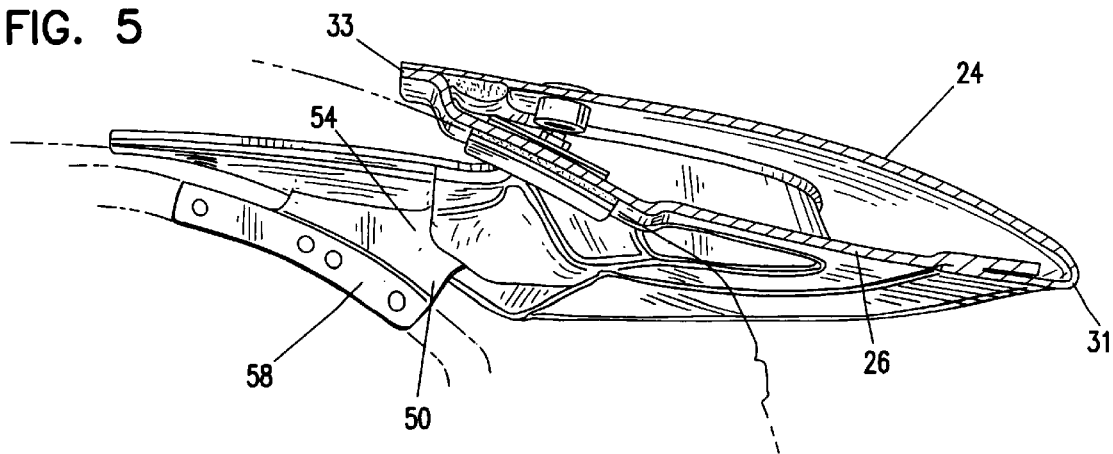
FIG. 5 is a sectional view of the windshield visor of FIG. 3 taken along line 5—5.

As used in the context of the present invention, the shading and shielding region 18 includes a forward wing 19, and wing tips 21, 23. It should be understood that the "wing tips" generally refer to the left and right ends of the shading and shielding region 18 and as shown in the figures, may include portions thereof which extend rearwardly. The underneath side of the wing tips 21, 23 preferably include double sided automobile adhesive tape 25 for adhering the wing tips to the roof of the vehicle, as shown in FIG. 4. The backing 27 can be peeled away exposing a tacky surface 29.

The shading and shielding region 18 is preferably constructed of a top panel 24 and a bottom panel 26. The top panel 24 is provided with a shell configuration for receiving the bottom panel 26 therein. The structure can be held together by any fastener commonly used in the art, such as, adhesive, bolts, welding, clamps, screws, and the like. Preferably, the fastener is an adhesive which provides sufficient structural adhesion between the materials.

The forward wing 19 formed by the top and bottom panels 24, 26 is preferably a closed structure having a leading edge 31 and a trailing edge 33. Generally, this means that a tube-like structure is provided which resists leakage of moisture, such as rain, therein. In addition, by fastening the two panels together, the rigidity and strength of the structure can be increased. In a preferred embodiment, the top and bottom panels 24, 26 are molded from a polymer containing material, such as 3/16 inch ABS resin (a polymer composition based on acrylonitrile-butadiene-styrene polymer), by vacuum molding to form the desired shapes. Although each of the panels is separately fairly flexible, a monocoque structure can be provided by combining and fastening the panels together. Thus, a relatively rigid and strong structure can be provided without the need for internal supporting structure. While a preferred embodiment of the invention is described in the context of the forward wing 19 being a tube-like structure which resists leakage, it should be appreciated that the forward wing is not limited to a tube-like structure which resists leakage.

It should be appreciated that various other materials can be selected for use in the present invention as would be apparent to one having ordinary skill in the art. For example, the top and/or bottom panels can be prepared by stamping sheet metal in an appropriate die, or can be formed from fiberglass, or from other known engineering plastics by, for example, vacuum molding, injection molding, and the like.

To provide additional rigidity to the entire windshield visor 10, when placed on a motor vehicle, a roof mounted stud post fastener 40 is provided. The windshield visor 10 is provided with two stud post fasteners 40 as part of the central mounting region 21. It should be appreciated that the windshield visor according to the invention can include as few as one stud post fastener or more than two stud post fasteners, such as three stud post fasteners.

The stud post fastener 40 secures the central mounting region 21 of the windshield visor 10 to the motor vehicle roof 14. This securement to the roof helps reduce flutter. The stud post fastener 40 includes a base 43 which is constructed to lay against the roof 14 of the motor vehicle, and a stud 45 extending from the base 43 and into and attaching to the shading and shielding region 18 of the visor. Applicants have found that the stud post fastener 40 can be attached to the motor vehicle roof 14 using adhesive fastener 42. An example of an adhesive fastener which can be used according to the invention is double sided tape available from 3M Corporation of St. Paul, Minn. Thus, the backing 47 can be pealed away from the adhesive fastener 42 to expose a tacky surface 48 which can bond to the roof of the motor vehicle. It is expected that the adhesive fastener 42 may not provide the desired degree of attachment if the temperature during the application of the adhesive fastener 42 is so low that the adhesive fastener 42 does not adequately cure. If the surface of the roof 14 is sufficiently clean and the temperature during application is high enough to allow curing of the adhesive fastener 42, it has been found that the adhesive fastener 42 provides sufficient attachment of the stud post fastener 40 to the roof 14.

It should be appreciated that the stud post fastener 40 can include fastener openings 44 in the base 43 for receiving, for example, bolts or screws, for attachment of the roof mounted stud post fastener 40 to the roof 14. If the screw or bolt type fastener is used, holes will be provided in the roof of the vehicle. Of course, it is expected that under most circumstances, one will not provide holes in the roof 14.

The stud 45 preferably includes threads 49 for receiving a washer 70 and a nut 72 for tightening. The stud 45 extends through an opening 74 in the bottom panel 26 at the mounting region 21. A gasket 76 is preferably provided between the inside surface 73 of the bottom panel 26 and the washer 70 to prevent moisture from entering into the interior of the visor through the opening 74. The nut 72 is preferably provided for securing the bottom panel 26 in place. An opening 78 is preferably provided in the top panel 24 for allowing access to the stud 45. That is, the gasket 76, the washer 70, and the nut 72 can be inserted into the visor interior through the opening 78 for attachment to the stud 45. Furthermore, the opening 78 is preferably sufficiently large to allow a socket type of wrench therethrough for tightening the nut 72. A cap 80 is provided for covering the opening 78. Preferably, the cap 80 prevents moisture from entering into the interior of the visor. A gasket can be provided around the adhesive fastener 42 to help keep moisture away from the adhesive.

Sufficient air relief is provided by the visor 10 by providing air relief vents 60. These vents allow sufficient amounts of air to escape from under the visor 10, and are provided as the pockets or gaps between the trailing edge 33 of the visor 10 and the roof 14 of the truck 12. If one stud post fastener is provided, two air relief vents are formed. If there are two roof mounted stud post fasteners, then there would be three air relief vents along the trailing edge of the visor. As would be apparent to one skilled in the art, the depth of the air relief vents should be sufficient to provide desired stress relief on the visor.

Recessed lights can be provided in the top panel 24, as described in U.S. Pat. No. 5,851,044, the disclosure of which is incorporated herein by reference. It should be appreciated that the recessed lights are optional and can be excluded, if desired. It is generally understood that the recessed lights provide a more pleasing look to the visor 10, and can provide additional illumination. A power cord can be provided to power the recessed lights from the vehicle power source.

Now referring to the mounting regions 20, 22. These regions are provided for attaching the visor 10 to the truck 12. The brackets or mounting plates 50 are provided for mounting the visor 10 to the door frame 17 of the truck 12. It should be appreciated that the internal rain gutter is considered a part of the door frame 17 of the motor vehicle. That is, in the case of a motor vehicle having an internal rain gutter, the brackets or mounting plates 50 can be referred to as being fastened to either the door frame of the truck or the interior rain gutters of the truck. The brackets 50 include ears 54, respectively, which are secured to both the top and bottom panels 24, 26 at the wing tips 21, 23. Preferably, the ears 54 are adhered to both the top and bottom panels 24, 26 by adhesive.

In a preferred embodiment, the top and bottom panels and the brackets are prepared for a particular model motor vehicle. The brackets, for example, can be formed by stamping 0.7 to 0.8 inch thick sheet metal. Thus, once the parts are formed, they are assembled and fastened together so that the ears 54 fit within the tube-like structure. Preferably, the ears 54 are bonded, by adhesive, to both the top and bottom panels 24, 26. In an alternative embodiment, the brackets 50 can be provided as an integral piece with the top panel 24 and/or the bottom panel 26. By this, it is meant that the brackets and the top and/or bottom panel can be formed from one piece of metal, plastic, fiberglass, ceramic, and the like.

The brackets 50 include fastening rails 58 which fit into the driver and passenger side door frames, of the truck 12 and attach thereto. Advantageously, the fastening rails can be designed to provide an exact fit for a particular model motor vehicle. Thus, the fastening rails can be moved along the door frame until it fits a particular predetermined location there along. Using the fastening rails as guides, the proper holes can be drilled, then the visor can be securely and accurately attached to the motor vehicle.

The fastening rails 58 can be provided with a predetermined design which will fit at only one location along the door frame of the motor vehicle. Once appropriate holes are drilled, self threading or self tapping screws 59 having low profile heads are preferably used to fasten the fastening rails to the door frame. A gasket can then be placed along the door frame. In certain model trucks, it is understood that the fastening rail can be provided with an additional hole for securing the gasket thereto upon completion of attaching the visor to the truck. Thus, the speed at which the visor can be assembled onto the motor vehicle is significantly reduced by the present invention.

The following discussion describes the mounting of a windshield visor 10 to a DODGE RAM, full size 1994 pickup truck. It should be appreciated that the following steps can be followed when mounting the windshield visor 10 to a different type of vehicle.

The driver and passenger side doors of the vehicle are opened, and the door gaskets in both of the door openings are removed or peeled away. The first two screws in the door seal bracket are removed. Preferably, the vehicle roof, door openings, and top edge of the doors are cleaned with soap and water and dried. A clear protectant can be applied to the door opening to protect the contact surface of the vehicle. It should be appreciated that the windshield visor can be painted to match the color of the motor vehicle.

The visor can be prefit to the vehicle by aligning the fastening rails 58, to the door openings. The fastening rails are preferably designed to fit the contour of the door openings. The fastening rails are preferably aligned so the second hole in the fastening rails matches the pre-existing hole in the vehicle. The visor is preferably taped in place, and the holes are drilled into the door frame.

The stud post fastener 40 is preferably mounted to the roof 14 by peeling the backing 47 away and firmly placing the adhesive fastener 42 onto a cleaned roof surface. Preferably, a gasket is placed around the roof mounted stud post fastener to reduce moisture from penetrating into the edges of the stud post fastener 40. The gasket 76, the washer 70, and the nut 72 are then inserted into the visor interior through the opening 78 for attachment to the stud 45. A socket type of wrench can be used for tightening the nut 72. A cap 80 is provided for covering the opening 78.

As is readily apparent from the description of the invention, another advantage of the present invention is the relative ease in placing the visor on the motor vehicle. The fastening rails 58 can be designed so that improper installation of the visor is greatly reduced. Furthermore, it is particular advantage of the present invention that a visor can be attached and later detached without putting holes in the roof of a motor vehicle or in another highly visible location. Rather, the holes are in the door frame and can be easily repaired or filled in without significantly detracting from the overall appearance of the motor vehicle. Furthermore, since the visor can be attached to the door frame, it is easy to lock the visor onto the motor vehicle by simply locking the doors of the vehicle.

What is claimed:

1. Windshield visor for motor vehicles having windshield, roof, and driver and passenger side door frames, said visor comprising:

a forward wing for providing shading from sun light and shielding from precipitation, the forward wing having left and right wing tips, top and bottom surfaces, and leading and trailing edges;

a first mounting plate connected to the left wing tip of said forward wing, the first mounting plate being constructed and arranged to attach to a motor vehicle's driver side door frame;

a second mounting plate connected to the right wing tip of said forward wing, the second mounting plate being constructed and arranged to fit a motor vehicle's passenger side door frame; and stud post fastener comprising a base and a stud, the base including adhesive for adhering to a motor vehicle roof and the stud for attaching to said forward wing.

2. A windshield visor according to claim 1, wherein said forward wing comprises a top panel and a bottom panel secured together in a tube-like closed structure.

3. A windshield visor according to claim 2, wherein the top panel and the bottom panel are secured together by adhesive.

4. A windshield visor according to claim 1, wherein the top panel comprises a molded polymer containing material.

5. A windshield visor according to claim 2, wherein the bottom panel comprises a molded polymer containing material.

6. A windshield visor according to claim 1, wherein the trailing edge of the forward wing is constructed and arranged to provide an air relief vent.

7. A windshield visor according to claim 1, wherein the adhesive comprises double sided adhesive tape.

8. A windshield visor according to claim 1, wherein the stud includes threads for receiving a bolt.

9. A motor vehicle comprising:

windshield;

driver and passenger side door frames;

roof; and visor, the visor comprising:

a forward wing for shading the windshield from sun light and shielding the windshield from precipitation, the forward wing having left and right wing tips, top and bottom surfaces, and leading and trailing edges;

first mounting plate connected to the left wing tip of the forward wing and the driver side door frame;

second mounting plate connected to the right wing tip of the forward wing and the passenger side door frame; and stud post fastener comprising a base and a stud, the base including adhesive adhering the stud post fastener to the roof and the stud attached to said forward wing.

10. A motor vehicle according to claim 9, wherein said forward wing comprises a top panel and a bottom panel secured together.

11. A motor vehicle according to claim 9, wherein the top panel and the bottom panel are secured together by adhesive.

12. A motor vehicle according to claim 9, wherein the top panel and the bottom panel comprise molded polymer containing materials.

13. A motor vehicle according to claim 9, wherein an air relief vent is provided between the trailing edge of the forward wing and the windshield.

14. A method for attaching a windshield visor to a motor vehicle, said method comprising the steps of:

(a) providing a visor comprising a top panel, a bottom panel, a first mounting plate, a second mounting plate, and a stud post fastener, the top and bottom panels being constructed and arranged to provide a forward wing having left and right wing tips, the first mounting plate attached to the left wing tip of the forward wing, the second mounting plate attached to the right wing tip of the forward wing, and the stud post fastener comprising a base and a stud, the base including adhesive for attaching to a motor vehicle roof and the stud for attaching to the forward wing; and (b) adhering the stud post fastener to a motor vehicle roof.

15. The method according to claim 14, further comprising a step of:

placing the mounting plates of the visor along the driver and passenger door frames of a motor vehicle.

16. The method according to claim 15, further comprising a step of:

fastening the visor to the door frame of the motor vehicle; and fastening the stud post fastener to the forward wing.

* * * * *